United States Patent [19]

Defreitas

[11] Patent Number: 5,316,376
[45] Date of Patent: May 31, 1994

[54] DECORATIVE WHEEL COVER

[76] Inventor: Manuel P. Defreitas, 62 Tulane Cres., Don Mills, Ontario, Canada, M3A 2C1

[21] Appl. No.: 19,649
[22] Filed: Feb. 19, 1993
[51] Int. Cl.5 .............................................. B60B 7/00
[52] U.S. Cl. ................................ 301/37.26; 301/37.25; 40/587
[58] Field of Search ................ 40/587, 152, 159, 600; 301/37.1, 37.25, 37.26, 37.36, 37.42

[56] References Cited

U.S. PATENT DOCUMENTS

| | | | |
|---|---|---|---|
| 1,832,605 | 11/1931 | Zallio | 40/587 |
| 2,176,535 | 10/1939 | Markoff | 40/159 |
| 2,220,038 | 10/1940 | Kreisler et al. | 40/152 |
| 3,528,705 | 9/1970 | Oldroyd | 301/37.42 |
| 3,671,076 | 6/1972 | Aske, Jr. | 301/37.42 |
| 3,860,295 | 1/1975 | Beisch | 301/37.26 |
| 4,388,771 | 6/1983 | Lalonde | 301/37.25 |
| 4,703,575 | 11/1987 | Diamond | 40/600 |
| 5,075,991 | 12/1991 | Wenkman et al. | 40/600 X |

*Primary Examiner*—Russell D. Stormer
*Attorney, Agent, or Firm*—S. Michael Bender

[57] ABSTRACT

A vehicle wheel cover adapted to clip on to a wheel rim wherein the wheel cover includes as an element thereof a disc, bearing decorative indicia, which may include a mounted photograph or artwork, and a superposed convex lens to magnify such indicia when viewed from a position exterior of the vehicle to which it may be attached.

3 Claims, 4 Drawing Sheets

DECORATIVE WHEEL COVER

BACKGROUND OF THE INVENTION

Field of the Invention

The present invention relates to vehicle wheel covers and more particularly pertains to a wheel cover which may present an enlarged view of decorative or informative indicia thereon.

The use of vehicle wheel covers is well known in the prior art. More specifically, such covers heretofore devised and utilized for the purpose of decoration, e.g. to simulate mag wheels or wire wheels, are known to consist basically of familiar, expected and obvious structural configurations, notwithstanding the myriad of designs encompassed by the crowded prior art which have been developed for the fulfillment of countless objectives and requirements. Many of these prior art covers also bear indicia (usually the car manufacturer's name, on the hub portion thereof.

Some decorative wheel covers are illustrated in issued patents, most particularly U.S. Letters Pat. No. 4,878,719. Other pertinent patents include U.S. Letters Pat. Nos. 5,016,144; 4,961,611; 4,240,670; 3,663,065; 3,639,036; 3,894,775.

The present invention attempts to overcome deficiencies in the prior art by employing a vehicle wheel cover for attachment to a vehicle wheel which may be utilized for displaying a photograph or artwork beneath a superposed convex lens that magnifies such indicia when viewed from a position exterior of the vehicle thereattached.

In this respect, the decorative wheel cover according to the present invention substantially departs from the conventional concepts and designs of the prior art.

SUMMARY OF THE INVENTION

In view of the foregoing disadvantages inherent in the known types of wheel covers now present in the prior art, the present invention provides an improved wheel cover. As such, the general purpose of the present invention, which will be described subsequently in greater detail, is to provide a new and improved decorative vehicle wheel cover and method which has all the advantages of the prior art and none of the disadvantages.

To attain this, the present invention utilizes as part of its construction a flat plate magnetically secured to the interior of a vehicle wheel cover and supporting thereon decorative or informative indicia including photographs if desired. Overlying and superposed on such indicia-bearing flat plate is a convex lens which serves to magnify such indicia.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved decorative wheel cover which may be easily and efficiently manufactured and marketed.

It is a further object of the present invention to provide a new and improved wheel cover which is of a durable and reliable construction.

An even further object of the present invention is to provide a new and improved decorative wheel cover which is susceptible of a low cost of manufacture with regard to both materials and labor, and which accordingly is then susceptible of low prices of sale to the consuming public, thereby making such covers economically available to the buying public.

Still yet another object of the present invention is to provide a new and improved vehicle wheel cover which provides in the apparatuses and methods of the prior art some of the advantages thereof, while simultaneously overcoming some of the disadvantages normally associated therewith.

Still another object of the present invention is to provide a new and improved wheel cover which presents a decorative or informational indicia thereon.

Yet another object of the present invention is to provide a new and improved decorative wheel cover wherein the appearance thereof can readily be changed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DESCRIPTION OF THE PREFERRED EMBODIMENT

Figure 1:
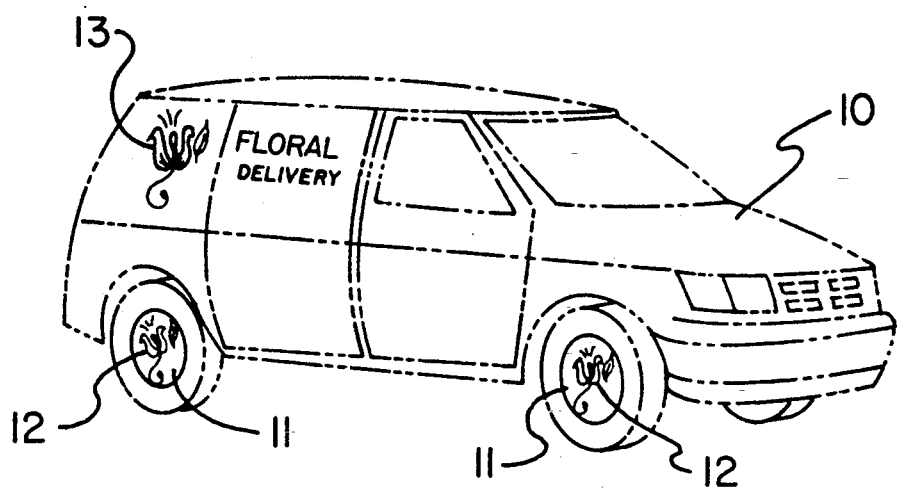
FIG. 1 shows a perspective view of a vehicle with decorative wheel covers of the present invention installed thereon.

The present invention is illustrated as it might appear in use in FIG. 1 of the drawings. Here, shown in perspective is a vehicle 10 having thereon the wheel covers 11 of this invention. The indicia 12 carried by the wheel covers 11 in this version carries out the logo 13 of the company using vehicle 10.

Figure 2:
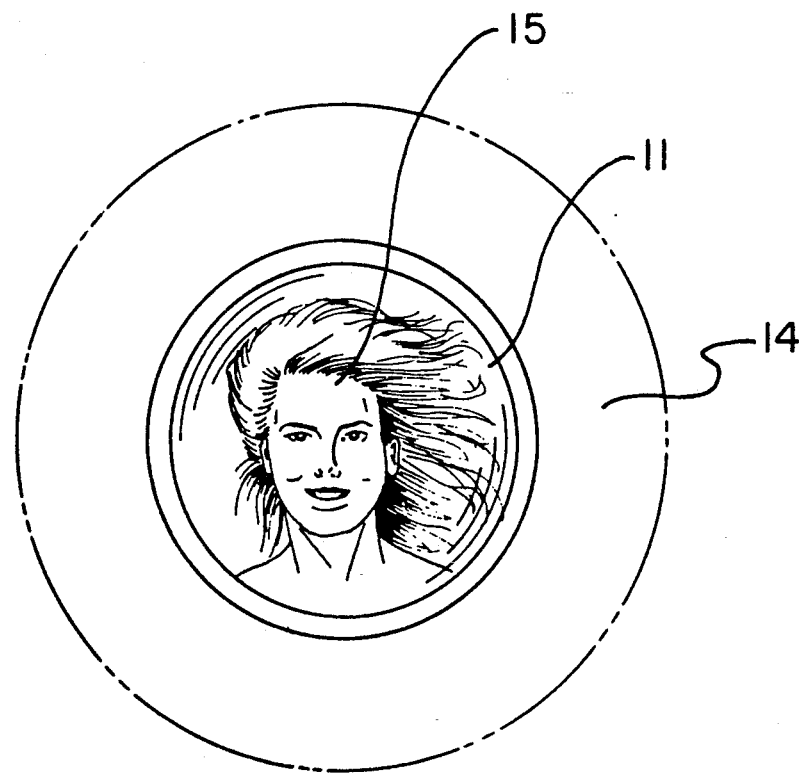
FIG. 2 is a side plan view of a vehicle wheel with one of the decorative wheel covers of the present invention attached thereto.

FIG. 2 shows another aspect of the invention wherein a personalized wheel cover 11 is shown mounted on a wheel 14. Here the indicia consists of a photograph 15 mounted on the wheel cover 11.

Figure 3:
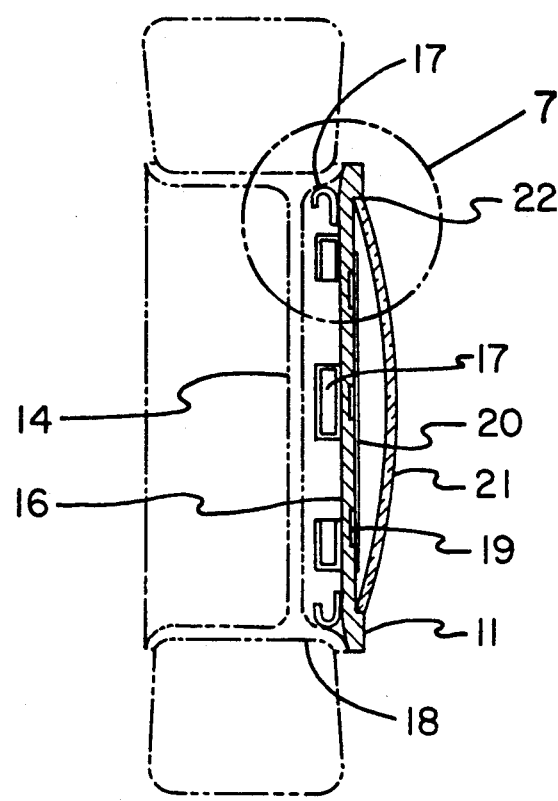
FIG. 3 is an end view of a vehicle wheel showing in partial section one of the wheel covers of the present invention thereon.

FIG. 3 illustrates in detail the present invention showing the wheel cover 11 positioned on a vehicle wheel 14. the cover 11 has a back support plate 16 o the back surface of which are affixed a plurality of clips 17 designed to snap into the rim 18 of wheel 14. Affixed to the face of back support plate 16 by magnets 19 is an indicia supporting member 20. Overlying member 20 is a transparent convex lens 21 frictionally held to back support plate 16 by engagement within a groove 22 in the outer rim thereof.

Figure 4:
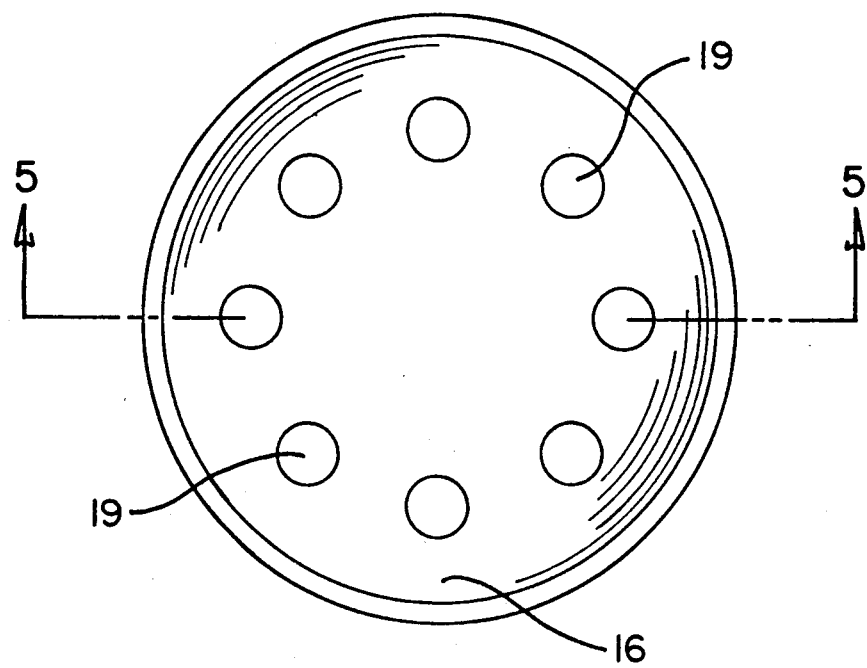
FIG. 4 is a plan view of one of the internal components of the cover of the present invention.
Figure 5:
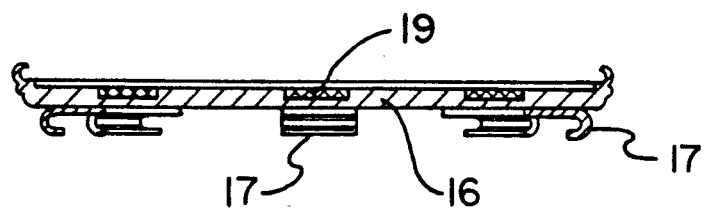
FIG. 5 is a sectional view on line 5—5 of FIG. 4.
Figure 6:
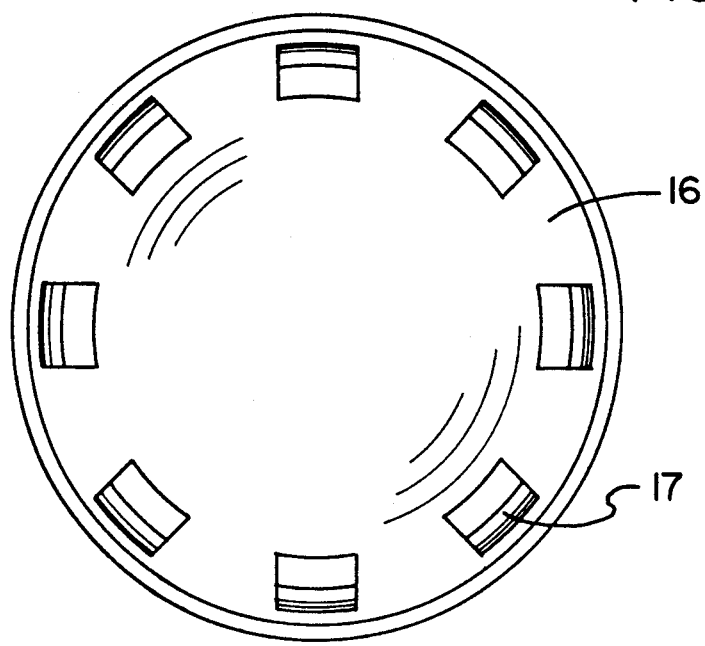
FIG. 6 is a plan view of the back of the cover of the present invention.

FIG. 4 shows the external face of back support plate 16 illustrating the plurality of magnets 19 embedded therein. As shown in FIG. 5, a section taken on line 5—5 of FIG. 4, magnets 19 are flush with the outer surface of back support plate 16. Reference numeral 17 again designates the clips 17 on the back of support plate 16. The back surface of support plate 16 is shown in FIG. 6 illustrating the spaced clips 17 around the periphery thereof.

Figure 7:
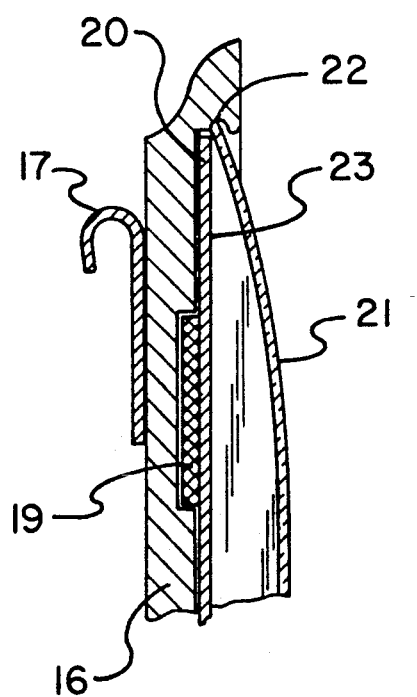
FIG. 7 is an enlarged view of the area shown in circle 7 on FIG. 3.
Figure 8:
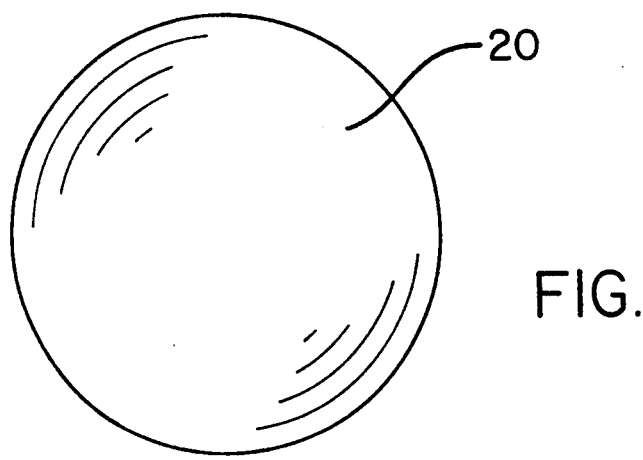
FIG. 8 and 9 respectively show a plan and a sideview of the indicia carrying disc of the present invention.
Figure 9:
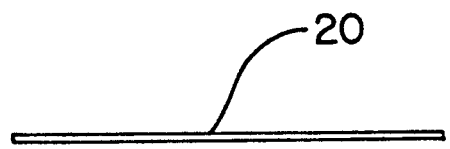
Figure 10:
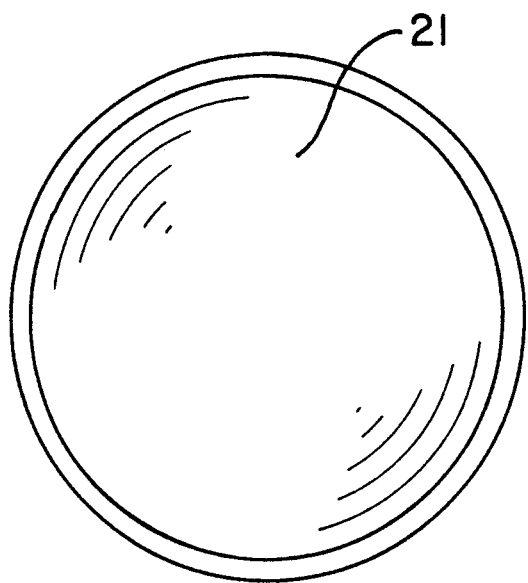
FIG. 10 and 11 respectively show a plan and an end view of the lens portion of the present invention.
Figure 11:
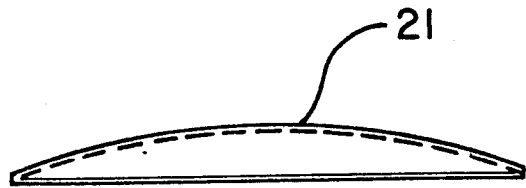

FIG. 7 is an enlarged view of that portion of FIG. 3 enclosed within the circle shown on FIG. 3. The assembled components of the present invention are illustrated in greater detail in this drawing. The back support plate 16 having clips 17 on the back thereof and embedded magnets 19 on the face thereof is shown. Affixed to the back support plate 16 by such magnets 19 is the indicia supporting member 20 with indicia 23 mounted thereon. Overlying such indicia 23 is the lens 21 with the end thereof frictionally engage in groove 22 in the back support plate 16. FIGS. 8 and 9 show plan and side view of indicia supporting member 20 while FIGS. 10 and 11 show similar views of lens 21.

In use, the cover 11 of the present invention is clipped into place on a vehicle wheel rim 18 with the indicia supporting member 20 affixed magnetically to the back support member 16 of such cover. This permits ready interchangeability of indicia support members 20 in the event it is wished to present different indicia to view. The convex lens 21 superposed over the indicia 23 presents a magnified view thereof towards the outside of the vehicle 10. The indicia support member 20 is preferably a rigid member formed from steel or an alloy thereof which will adhere to a magnet. The convex lens 21 can be made of any suitable transparent plastic and should be capable of some deformation to permit engaging said lens within the confining groove 22 on the back support plate periphery.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle wheel cover securable to a wheel rim of a vehicle, said vehicle wheel cover comprising:
   a solid circular support plate having a groove circumscribing a periphery thereof;
   a plurality of clips being substantially U-shaped and fixedly secured to a back area of said support plate in a spaced relationship, said plurality of clips being operable to releasable snap into and secure a portion of said wheel rim of a vehicle;
   a plurality of circular magnets secured to and embedded in a front area of said support plate so as to lie flush therein;
   at least one circular indicia supporting member comprised of a substantially ferrous material, said at least one indicia supporting plate by an engagement with said plurality of circular magnets and operable to releasably mount indicia thereon; and,
   a transparent convex lens capable of deformation and having a substantially circular shape defining an end around a periphery thereof and adapted to be placed against said circular support plate to releasably engage said groove of said circular support plate, said transparent convex lens being operable to magnify all of said indicia supporting member.

2. The vehicle wheel cover of claim 1, wherein said plurality of clips comprises eight clips arranged in diametrically opposed pairs proximate a periphery of said circular support plate.

3. The vehicle wheel cover of claim 2, wherein said plurality of magnets comprises eight magnets, each of said magnets having a flat, cylindrical shape, said magnets being embedded in said circular support plate in diametrically opposed pairs radially spaced from a center area of said circular support plate.

* * * * *